T. E. SANDERSON.
AUTOMOBILE ACCESSORY.
APPLICATION FILED JUNE 18, 1921.
1,424,382.
Patented Aug. 1, 1922.
FIG. I.
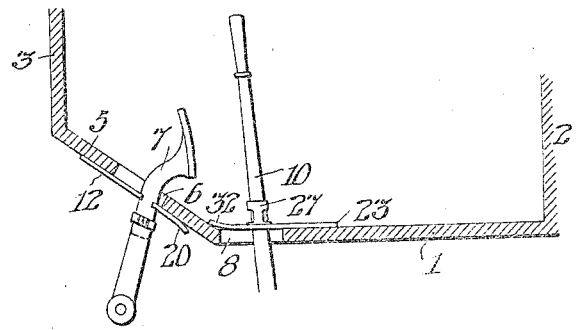
FIG. II.
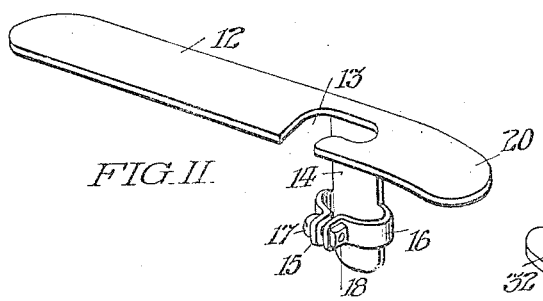
FIG. III.
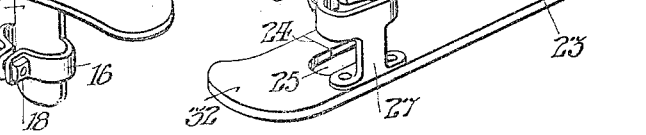
FIG. IV.
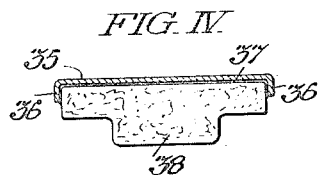
INVENTOR:
Thomas Edward Sanderson,

UNITED STATES PATENT OFFICE.

THOMAS EDWARD SANDERSON, OF WOODBURY, NEW JERSEY.

AUTOMOBILE ACCESSORY.

1,424,382.      Specification of Letters Patent.      Patented Aug. 1, 1922.

Application filed June 16, 1921. Serial No. 478,742.

*To all whom it may concern:*

Be it known that I, THOMAS EDWARD SANDERSON, a citizen of the United States, residing at Woodbury, in the county of Gloucester and State of New Jersey, have invented a certain new and useful Improvement in Automobile Accessories, whereof the following is a specification, reference being had to the accompanying drawing.

Automobiles usually have slots through the floor at the chauffeur's feet for the vehicle controlling members, including the reverse pedal, the brake pedal, the clutch pedal and the hand lever, which latter is used to control the emergency brake and shift the gearing into neutral position. Whenever such a vehicle is in motion, there is a strong draft of air upward into the vehicle through each of said slots. In summer, the air is hot from the engine and laden with dust, and in winter, the incoming air is so cold that it is impossible to keep the chauffeur's feet warm.

Therefore, the general object of this invention is to provide accessories for such vehicles adapted to prevent such air drafts through such slots, without interfering with the operation of the vehicle controlling members aforesaid.

I am aware that it is not broadly new to provide means intended to cover such slots. However, so far as I am aware, such prior devices have been independent of the controlling members and either directly or indirectly attached to the floor surrounding said slots. Consequently, aside from any question as to their operativeness, such prior devices have required skilled labor to effect their installation in the vehicle. On the contrary, it is characteristic of the form of my invention hereinafter described that the means for covering the slots are independent of the vehicle floor, and carried by the controlling members for which they are respectively designed. As hereinafter described, my invention includes shields formed of more or less flexible material provided with clamping means whereby they may be respectively detachably and adjustably connected with the respective pedal and hand levers.

My invention includes the various novel features of construction and arrangement hereinafter more definitely specified.

In said drawing; Fig. I is a fragmentary vertical sectional view of the vehicle floor showing shields embodying my invention respectively applied to a pedal and to a hand lever.

Fig. II is a perspective view of the shield which is shown attached to the pedal in Fig. I.

Fig. III is a perspective view of the shield which is shown attached to the hand lever in Fig. I.

Fig. IV is a cross sectional view of a shield embodying my invention, including a metal member faced with felt.

In said figures; 1 is the floor of the vehicle extending in front of the chauffeur's seat 2 to the dash 3. Said Fig. I diagrammatically represents the construction and arrangement of a "Ford" car in which the upwardly inclined portion of the floor 5 is provided with three slots 6 respectively for the reverse pedal 7, which I have indicated, and the brake pedal and the clutch pedal, which I have omitted. Said car has also the single slot 8, in the horizontal portion of said floor 1 for the hand lever 10. I provide a closure shield for each of said slots.

Fig. II shows the details of the construction of the shield which is carried by said reverse pedal 7 and which is similar to the shields carried by the brake pedal and clutch pedal. Said shield includes the plate 12 which may be formed of primarily plane pressed sheet metal, or other suitable material, and is provided with the opening 13 to receive said lever 7 and has the vertical flange 14 extending parallel with the side face of said pedal lever 7 and provided with opposite tabs 15 and 16 connected by the bolt 17 and nut 18 which clamp said shield upon said pedal lever 7.

Although said plate 12 is primarily plane, I prefer to bend the end 20 thereof as indicated in Figs. I and II, so as to allow for the change in its angular position effected by forward movement of said pedal 7. However, it is to be understood that said plate might be made of material sufficiently flexible to automatically accommodate itself to such change in angular position.

Fig. III shows the details of construction of the shield which is carried by said hand lever 10 and includes the plate 23 which may be formed of primarily flat fabric, for instance, of rubber composition, such as is employed in step treads and door mats and which is split at 24 so that the lever 10 may be slipped into the opening 25 through said plate 23. Said shield, plate or strip 23 is provided with a bracket, conveniently formed of metal and including the vertical flange 27, parallel with the side face of said lever 10 and having tabs 28 and 29 connected by the bolt 30 and nut 31 to clamp said shield upon said lever 10. I have shown the front end of said shield plate 23 bent upwardly, at 32, because it is thus bent when thrust forward up said inclined portion of the floor 5. However, it is to be understood that said plate 23 is so far flexible that it gravitates into contact with said floor 1, whenever free to do so, as distinguished from the shield plate 12 which must be stiff enough to uphold itself against the lower surface of said floor 5.

Although I have shown both of said shield plates 12 and 23 formed flat; so that they do not enter into the slots 6 and 8 which they are respectively designed to cover; it is to be understood that shields may be made in accordance with my invention having portions fitting into said slots in such manner as to substantially hermetically seal the latter. For instance, as indicated in Fig. IV, a shield plate 35 may be formed of pressed sheet metal with flanges 36 forming a seat in which is secured, by cement 37 or otherwise, a cover strip 38 which may be of more flexible material, such as felt or soft rubber. Of course, such a shield may be applied either below the floor like the shield 12 or above the floor like the shield 23.

Moreover, although I have found it desirable to employ such bifurcated clamping means as I have shown, to enable said controlling members to carry their respective closures; any other suitable securing means may be employed. Therefore, I do not desire to limit myself to the precise details of construction and arrangement herein set forth, as it is obvious that various modifications may be made therein, without departing from the essential features of my invention, as defined in the appended claims.

I claim:

1. A closure for a controlling lever slot in a vehicle floor, comprising a shield independent of said floor, and carried by the controlling member extending through said slot; bifurcated clamping means permanently connected to said shield and arranged to embrace said controlling lever, in detachable adjustable relation therewith; and a screw bolt extending through said bifurcations and provided with a nut, arranged to clamp said shield upon said controlling member.

2. A closure for a controlling lever slot in a vehicle floor, comprising a shield independent of said floor, and carried by the controlling member extending through said slot; clamping means permanently connected to aid shield and arranged to engage said controlling member, in detachable adjustable relation therewith; and screw means arranged to clamp said shield upon said controlling member.

3. A closure for a controlling member opening in a vehicle floor, comprising a shield independent of said floor, and carried by the controlling member extending through said opening; means connected to said shield and arranged to engage said controlling member, in detachable adjustable relation therewith.

4. A closure for a controlling member opening in a vehicle floor, comprising a shield independent of said floor, and carried by the controlling member extending through said opening.

5. An automobile accessory; comprising a closure for a floor opening, having bifurcated clamping means arranged to detachably engage a controlling member extending through said opening; whereby said closure may be carried by said member independently of said floor.

6. An automobile accessory; comprising a closure for a floor opening, having clamping means arranged to detachably engage a controlling member extending through said opening; whereby said closure may be carried by said member independently of said floor.

7. An automobile accessory; comprising a closure for a floor opening, having means arranged to detachably engage a controlling member extending through said opening; whereby said closure may be carried by said member independently of said floor.

In testimony whereof, I have hereunto signed my name at Philadelphia, Pennsylvania, this sixteenth day of June, 1921.

THOMAS EDWARD SANDERSON.

Witnesses:
ARTHUR E. PAIGE.
CAROLYN E. REUTER.